United States Patent [19]

Ryffel

[11] Patent Number: 5,284,062
[45] Date of Patent: Feb. 8, 1994

[54] SENSOR FOR MEASURING ELONGATIONS

[75] Inventor: Martin Ryffel, Dietikon, Switzerland

[73] Assignee: Straintec AG, Zurich, Switzerland

[21] Appl. No.: 850,130

[22] Filed: Mar. 12, 1992

[51] Int. Cl.⁵ .............................. G01B 7/16
[52] U.S. Cl. .............................. 73/768
[58] Field of Search ............ 73/768, 774, 777–780, 73/784, 786; 340/690

[56] References Cited

U.S. PATENT DOCUMENTS

| 2,599,578 | 6/1952 | Obert et al. | 73/768 |
| 4,429,579 | 2/1984 | Wilhelm. | |
| 4,530,245 | 7/1985 | Jacobson | 73/768 |
| 4,936,149 | 6/1990 | Jacobson | 73/768 |

FOREIGN PATENT DOCUMENTS

| 2537369 | 3/1977 | Fed. Rep. of Germany. | |
| 3010168 | 9/1981 | Fed. Rep. of Germany. | |
| 3244171 | 5/1984 | Fed. Rep. of Germany. | |
| 3523638 | 1/1986 | Fed. Rep. of Germany. | |
| 7502761 | 11/1975 | Netherlands. | |
| 188113 | 10/1966 | U.S.S.R. | 73/768 |

Primary Examiner—Robert Raevis
Attorney, Agent, or Firm—Harness, Dickey & Pierce

[57] ABSTRACT

The sensor which is adapted to e inserted into a bore includes a cylinder-shaped body made of an elastomeric material and four resistive wire strains are uniformly distributed around its circumference. This body of an elastic material can be pressed together by means of tensioning members. This causes a deformation of the body in radial direction, such that the resistive wire strains are pressed against the wall of the bore and contact same in a force-locked manner. At the same time, the sensor is held arrested in the bore. Accordingly, an elongation of the structural member is directly transmitted onto the resistive wire strains, such that errors in the signal transmission are avoided.

8 Claims, 2 Drawing Sheets

SENSOR FOR MEASURING ELONGATIONS

BACKGROUND OF THE INVENTION

1. FIELD OF THE INVENTION

The present invention relates to a sensor for measuring the elongation of a structural member in a bore.

2. DESCRIPTION OF THE PRIOR ART

The German specification DE-A-25 37 369 discloses elongation meters having a measuring rod mounted to an end of a bore of which the free end cooperates with a measuring device which detects the difference of length between the structural member having a bore and the measuring rod upon a loading of the structural member. The measuring device is designed as device for detecting a tube-bending force and includes at the area of the largest deflection at least one resistive wire strain or wire strain gauge, respectively.

Such measuring detectors have the drawback that due to the thread and the different linear extensions the conversion of measuring signals is inaccurate.

SUMMARY OF THE INVENTION

It is therefore a general object of the present invention to provide a sensor by means of which the mentioned drawback is avoided and by means of which the elongation representing the forces and the stresses are measured directly at the material surrounding the bore.

A further object is to provide a sensor for measuring the elongation of a structural member in a bore comprising a cylinder-shaped body made of an elastic material, and at least one resistive wire strain arranged on the circumference of the cylinder-shaped body, a means for pressing the at least one resistive wire strain against the inner wall of the bore in such a manner that the at least one resistive wire strain is in contact with the inner wall by resistive forces in a force-locked manner in order to measure the elongation caused by an acting of force onto the structural member having the bore.

A still further object is to provide a sensor in which the bore is a blind hole and the cylinder-shaped body includes a portion which matches the base of the bore, and in which the pressing means comprises a threaded bolt which, in order to exert a pressure onto the cylinder-shaped body, is adapted to be screwed into the bore in order to press the at least one resistive wire strain against the inner wall of the bore.

Such an embodiment is of a specifically easy structure and can be mounted easily.

Yet, a further object is to provide a sensor in which the cylinder-shaped body includes a through bore extending axially therethrough, and in which the pressing means includes a threaded bolt having a head portion at one end and a threaded portion at the other end, arranged in such a manner that a shaft portion having a smooth surface is positioned between the ends on which smooth surface the cylinder-shaped body is located; including further a cylinder-shaped intermediate member having an axial through bore and which contacts at one face end the cylinder-shaped body and is located on the threaded bolt and including a tensioning nut which is threaded onto the threaded portion; whereby the cylinder-shaped body, which is positioned between the head portion and the intermediate member, is adapted to be deformed by the pressure caused by this threaded structure in such a manner that the at least one resistive wire strain is pressed against the inner wall of the bore. Such an embodiment necessitates merely a bore hole in the corresponding structural member in order to receive the sensor structured as entire unit. Furthermore, the design of such an embodiment is extremely simple.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE PREFERRED EMBODIMENT

Figure 1:
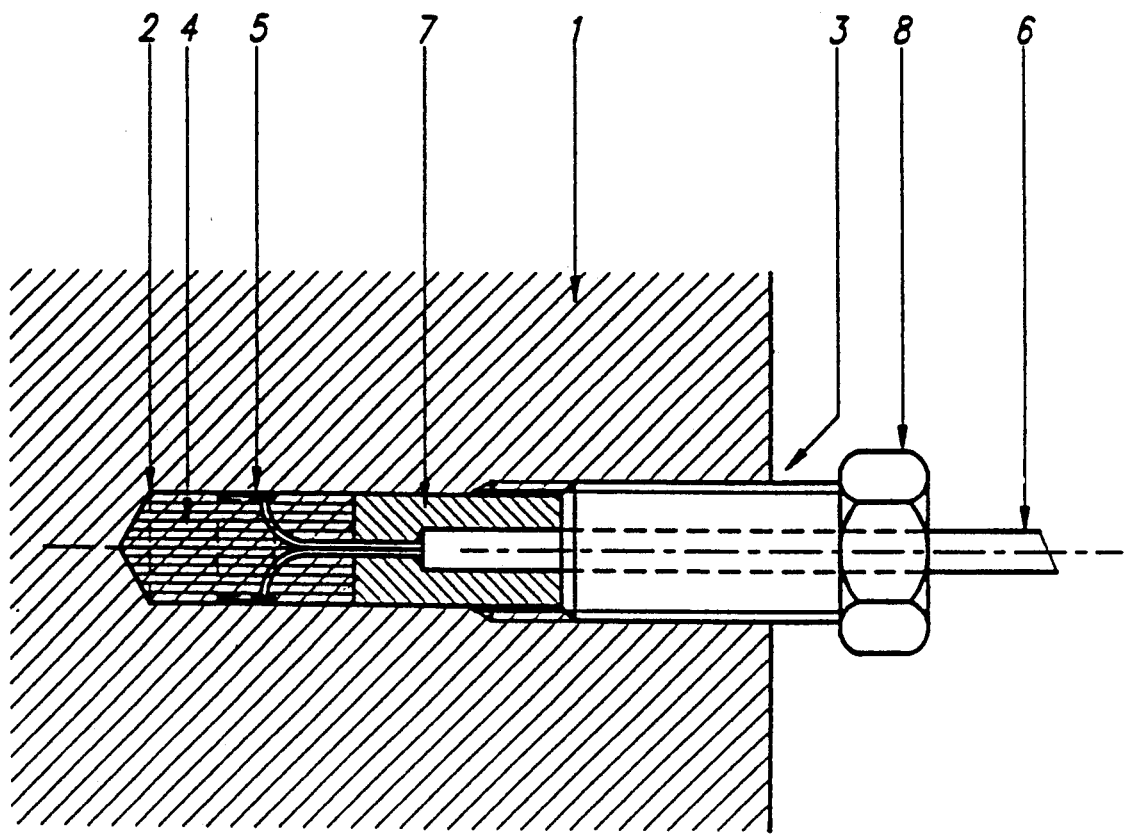
FIG. 1 illustrates a first embodiment of the sensor structured in accordance with the invention.

FIG. 1 illustrates a part of a structural member 1 of a machine, for instance a column, a tie-rod or similar structure, which includes a blind hole 2 having a threaded section adapted for receiving a sensor 3. The sensor 3 includes a body 4 made of an elastomeric material, which contacts the base of the blind hole. For this reason the body includes at its face end a portion which matches the shape of the base of the blind hole, and further includes at its other face end a planar surface. Four resistive wire strains 5 are inserted between the wall of the bore and the body 4, which are distributed uniformly around the circumference of the body 4.

The body 4 includes channels for the leading out of the connecting wires 6 of the resistive wire strains 5. The sensor 3 comprises, furthermore, a cylinder-shaped intermediate piece 7, located in the blind hole 2 and contacting the body 4. The intermediate piece 7 has an axially extending channel for receiving the connecting wires of the resistive wire strains or wire strain gauges, respectively, 5. The sensor 3 includes, furthermore, a hexagonal screw 8, having an axially extending through hole, allowing a leading out of the connecting line to the wire strain gauges 5. The hexagonal screw 8 is screwed into the threaded section in the blind hole 2. When threading the hexagonal screw 8 in, an axial force is made to act via the intermediate piece 7 onto the elastomeric body 4. This force causes the resistive wire strains 5 to be pressed against the wall of the bore. If now an elongation of the structural member 1 occurs due to a force acting thereupon, a corresponding output signal is emitted from the resistive wire strains.

Figure 2:
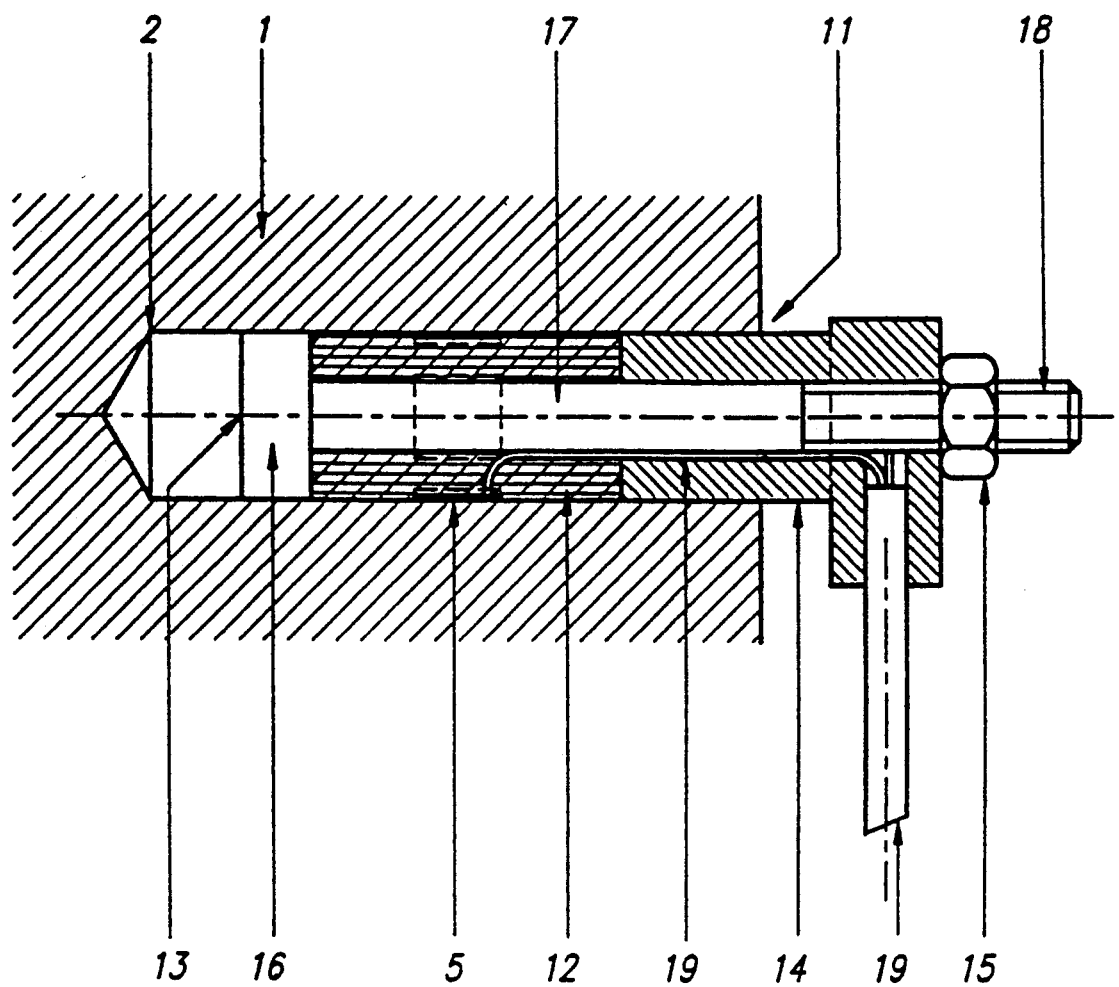
FIG. 2 illustrates a second embodiment of a sensor structured in accordance with the present invention.

According to the illustration of FIG. 2, the sensor 11 includes four resistive wire strains 5, a cylinder-shaped body 12 made of an elastomeric material, a threaded bolt 13, a cylinder-shaped intermediate member 14 and a tensioning nut 15. The threaded bolt 13 has at one end a head portion 16, followed adjacently by a shaft portion 17 having a smooth surface, and a threaded portion 18 at the other end. The body 12 has a through bore extending in axial direction and is located in such a manner on the shaft portion 17 that it abuts at one face surface the head portion 16. Four resistive wire strains 5 are inserted between the wall of the bore and the body 12, which are uniformly distributed along the circumference of the cylinder-shaped body 12. The intermediate member 14 includes a through bore extending in axial direction thereof, and is located in such a manner on the shaft portion 17 that it contacts the cylinder-shaped body 12. The tensioning nut 15 is threaded onto the threaded portion 18 and holds the individual members together such that a structural unit is presented. Passages for the connecting wires 19 of the resistive wire strains are formed in the cylinder-shaped body 12 and the intermediate member 14. These connecting wires extend through the head portion towards the outside, which head portion is integrally made with the intermediate member 14.

The sensor, which is now structured as complete unit, is inserted into the blind hole 2. By a rotating of the tensioning nut 15, the elastomeric body 12 is compressed. This causes a deformation of the body 12 in a radial direction, such that the resistive wire strains 5 are pressed against the wall of the bore.

While there are shown and described present preferred embodiments of the invention, it is to be distinctly understood that the invention is not limited thereto but may be otherwise variously embodied and practiced within the scope of the following claims.

I claim:

1. A sensor for measuring the elongation of material surrounding a structure member in a bore, comprising a cylinder-shaped body made of an elastomeric material, and at least ne resistive wire strain gauge arranged on the circumference of said cylinder-shaped body, a means for pressing said at least one resistive wire straing gauge against the inner wall of the bore in such a manner that said at least one resistive wire straing gauge is in contact with the inner wall by resistive forces in a force-locked manner in order to measure the elongation caused by an acting of force onto the structure member having the bore.

2. The sensor of claim 1, in which said cylinder-shaped body is a hollow body filled by a liquid.

3. The sensor of claim 1, comprising at least four resistive wire strain gauges.

4. The sensor of claim 1, in which said bore is a blind hole and said cylinder-shaped body includes a portion which matches the base of said bore, and in which said pressing means comprises a threaded bolt which, in order to exert a pressure onto said cylinder-shaped body, is adapted to be screwed into said bore in order to press said at least one resistive wire strain gauges against the inner wall of the bore.

5. The sensor of claim 4, comprising an intermediate piece located between said cylinder-shaped body and said threaded bolt.

6. The sensor of claim 1, in which the cylinder-shaped body includes a through bore extending axially therethrough and in which the pressing means includes a threaded bolt having a head portion at one end and a threaded portion at the other end arranged in such a manner that a shaft portion having a smooth surface is positioned between the ends on which smooth surface the cylinder-shaped body is located; further including a cylinder-shaped intermediate member having an axial through bore and which contacts at one face end the cylinder-shaped body and is located on the threaded bolt, and including a tensioning nut which is threaded onto said threaded portion of said threaded bolt; whereby the cylinder-shaped body, which is positioned between the head portion and the intermediate member, is adapted to be deformed by the pressure caused by this threaded structure in such a manner that the at least one resistive wire strain is pressed against the inner wall of the bore.

7. The sensor of claim 1, in which the pressing means comprises connection wires for the resistive wire strain gauge and recess means for accessing said connection wires.

8. A sensor for measuring the elongation of material in which a bore is disposed, comprising a cylinder-shaped body made of an elastomeric material, and at least one resistive wire strain gauge arranged on the circumference of said cylinder-shaped body, means for pressing said at least one resistive wire straing gauge against the inner wall of the bore in such a manner that said at least one resistive wire straing gauge is in contact with the inner wall by resistive forces in a manner which measures the elongation caused by the action of the resistive force onto the cylinder shaped body within the bore.

* * * * *